United States Patent
Cai

(10) Patent No.: US 9,038,654 B2
(45) Date of Patent: May 26, 2015

(54) DOUBLE-HANDLE FAUCET

(71) Applicant: Jilin Cai, Fujian Province (CN)

(72) Inventor: Jilin Cai, Fujian Province (CN)

( * ) Notice: Subject to any disclaimer, the term of this patent is extended or adjusted under 35 U.S.C. 154(b) by 111 days.

(21) Appl. No.: 13/899,574

(22) Filed: May 22, 2013

(65) Prior Publication Data

US 2014/0345725 A1    Nov. 27, 2014

(51) Int. Cl.
| | | |
|---|---|---|
| *E03C 1/04* | (2006.01) | |
| *E03C 1/02* | (2006.01) | |
| *F16K 11/22* | (2006.01) | |
| *F16K 31/60* | (2006.01) | |
| *F16K 11/00* | (2006.01) | |
| *F16K 11/20* | (2006.01) | |

(52) U.S. Cl.
CPC ............ *F16K 19/006* (2013.01); *F16K 11/207* (2013.01); *F16K 31/60* (2013.01); *E03C 1/0401* (2013.01); *E03C 2001/0416* (2013.01); *E03C 1/04* (2013.01)

(58) Field of Classification Search
CPC ....... E03C 1/04; E03C 1/0401; E03C 1/0404; E03C 2001/0416; F16K 19/006; F16K 11/207; F16K 31/60
USPC ............... 137/315.12, 315.13, 603, 801, 359, 137/375; 4/678
See application file for complete search history.

(56) References Cited

U.S. PATENT DOCUMENTS

| | | | | |
|---|---|---|---|---|
| 2008/0264502 | A1* | 10/2008 | Lin ................................. | 137/603 |
| 2010/0096034 | A1* | 4/2010 | Hou ............................... | 137/801 |
| 2012/0056351 | A1* | 3/2012 | Xu .................................. | 264/277 |
| 2013/0192686 | A1* | 8/2013 | Zhu et al. .................... | 137/15.01 |
| 2013/0213509 | A1* | 8/2013 | Thomas ........................ | 137/801 |

* cited by examiner

*Primary Examiner* — Atif Chaudry

(57) ABSTRACT

The present invention discloses a novel double-handle faucet comprising two valve seats, two spools, two inlet pins, two handles, an outlet pipe, a connecting tube, an upper panel, a lower panel, a cladding member, and two caps, the two valve seats, the connecting tube, the cladding member, and two caps are all made of a plastic material, each of the valve seats is provided with an upper annular flange and a lower annular flange, each of the inlet pins is further provided with a connecting ring, the cladding member comprises two first enveloping parts and a second enveloping part, the two first enveloping parts are located at both sides and are both provided with a chamber for accommodating the valve seats at respective side, the chamber is provided with a positioning step at the bottom, the connecting ring is abutted against the positioning step, the second enveloping part covers the outer side of the connecting tube, each of the caps is provided with a cover body and a circular engaging edge which is formed along the periphery of the cover body. As compared with the prior art, the present invention not only avoids lead contamination, but also has a low cost.

1 Claim, 7 Drawing Sheets

DOUBLE-HANDLE FAUCET

BACKGROUND OF THE INVENTION

The present invention relates to the field of bathroom accessories, and more particularly to a novel double-handle faucet, which can avoid lead hazard, ensures a structural strength, and has a low cost.

As shown in FIGS. 1 and 2, a conventional double-handle faucet 9 mainly comprises two valve seats 91, two spools 92, two handles 93, two inlet pins 94, an outlet pipe 95, a connecting tube 96, an upper panel 97, and a lower panel 98. The two valve seats 91 and the connecting tube 96 are casted into one piece. The two inlet pins 94 form a water connection with the outlet pipe 95 via the connecting tube 96. The spools 92 are installed in the valve seats 91 to control the conduction state between the inlet pins 94 and the connecting tube 96. An end of the control lever 921 of the spool 92 passes through the upper panel 97 and then is connected with the handle 93. A lower end of the inlet pin 94 passes through the lower panel 98 and then is jacketed with a gasket 99 so as to connect with a cool water pipe or a hot water pipe. Thereby, during use, one can obtain water with a suitable temperature from the outlet pipe 95 by rotating the two handles 93. In the conventional double-handle faucet 9 described above, the valve seats 91 and the connecting tube 96 are generally made of a copper alloy, which not only has a high cost, but also pose certain hazard on the user due to lead in the copper alloy.

To solve the above problems, many manufacturers have developed to mold the double-handle faucet 9 in such a manner that the valve seats 91 and the connecting tube 96 are formed by engineering plastics, and the valve seats 91 and the inlet pins 94 are then connected by secondary encapsulation. In this way, the pollution of water due to lead in the copper alloy is overcome. However, in the practical processing, engineering plastics of high quality are applied to ensure the whole strength of the double-handle faucet 9. As a result, this suffers from a relatively high cost, which has a significantly adverse effect on the mass marketing of the product.

In view of this, the present inventor has made an intensive study on the above drawbacks of the existing double-handle faucet 9, and thus come up with the present invention.

BRIEF SUMMARY OF THE INVENTION

It is an object of the present invention to provide a novel double-handle faucet. With the double-handle faucet of the invention, it is possible to not only avoid lead hazard, but also greatly reduce the cost by a structural design, which eliminates the use of high quality engineering plastics, and facilitates mass marketing of the product.

To achieve the above object, the present invention proposes the following technical solution:

a novel double-handle faucet comprising two valve seats, two spools, two inlet pins, two handles, an outlet pipe, a connecting tube, an upper panel, and a lower panel, the two valve seats are connected by the connecting tube; wherein, the novel double-handle faucet further comprises a cladding member, and two caps, the two valve seats, the connecting tube, the cladding member, and two caps are all made of a plastic material, each of the valve seats is provided with an upper annular flange and a lower annular flange which are arranged in the vertical direction and spaced apart from each other, each of the inlet pins is further provided with a connecting ring, the cladding member comprises two first enveloping parts and a second enveloping part which is between the two first enveloping parts and forms an integral part with the two first enveloping parts, the two first enveloping parts are located at both sides and are both provided with a chamber for accommodating the valve seats at respective side, the chamber is provided with a positioning step at the bottom, the connecting ring is abutted against the positioning step, the second enveloping part covers the outer side of the connecting tube, each of the caps is provided with a cover body and a circular engaging edge which is formed along the periphery of the cover body, the cover body is provided with a through hole through which the valve seats and the spool pass, when the circular engaging edge and the first enveloping part are fully engaged with each other, the upper surface of the upper annular flange collides with the lower surface of the cover body.

With the above structure, in the novel double-handle faucet of the invention, the two valve seats, the connecting tube, the cladding member, and two caps are all made of a plastic material, so that lead hazard can be completely removed. Besides, based on the provision of the cladding member and the structural design regarding the valve seat, the inlet pins, and two caps, the valve seats and the inlet pins can be firmly fastened by the cladding member, and two caps, so as to fasten the inlet pin and the valve seats. In this way, the whole structural strength of the double handle can be greatly enhanced. Therefore, at the premises of meeting the relating industrial standards, it is possible to reduce strength of the plastics itself, thus further reduce the production cost significantly.

Figure 1:
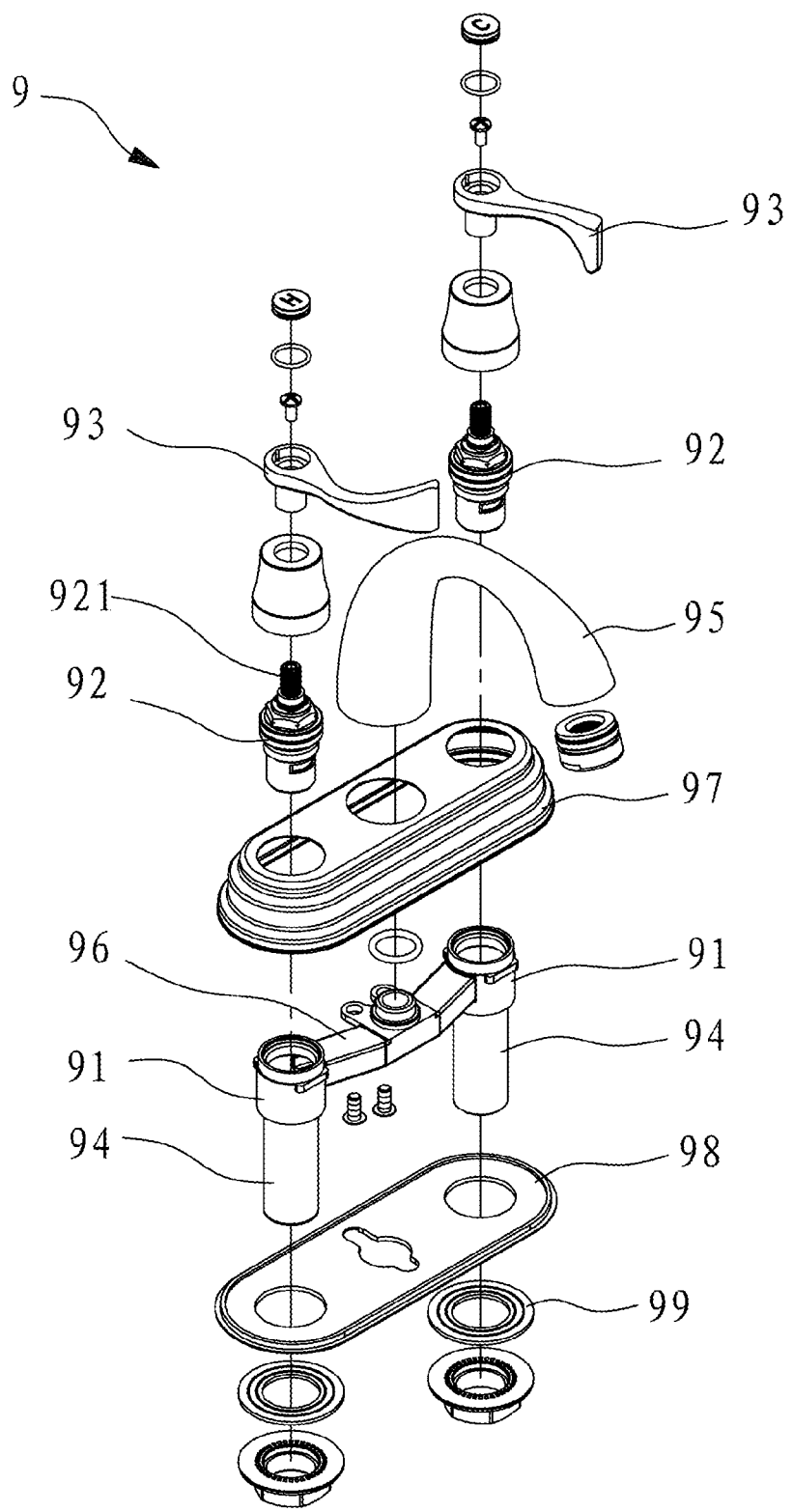
FIG. 1 is an exploded view showing the existing double-handle faucet.
Figure 2:
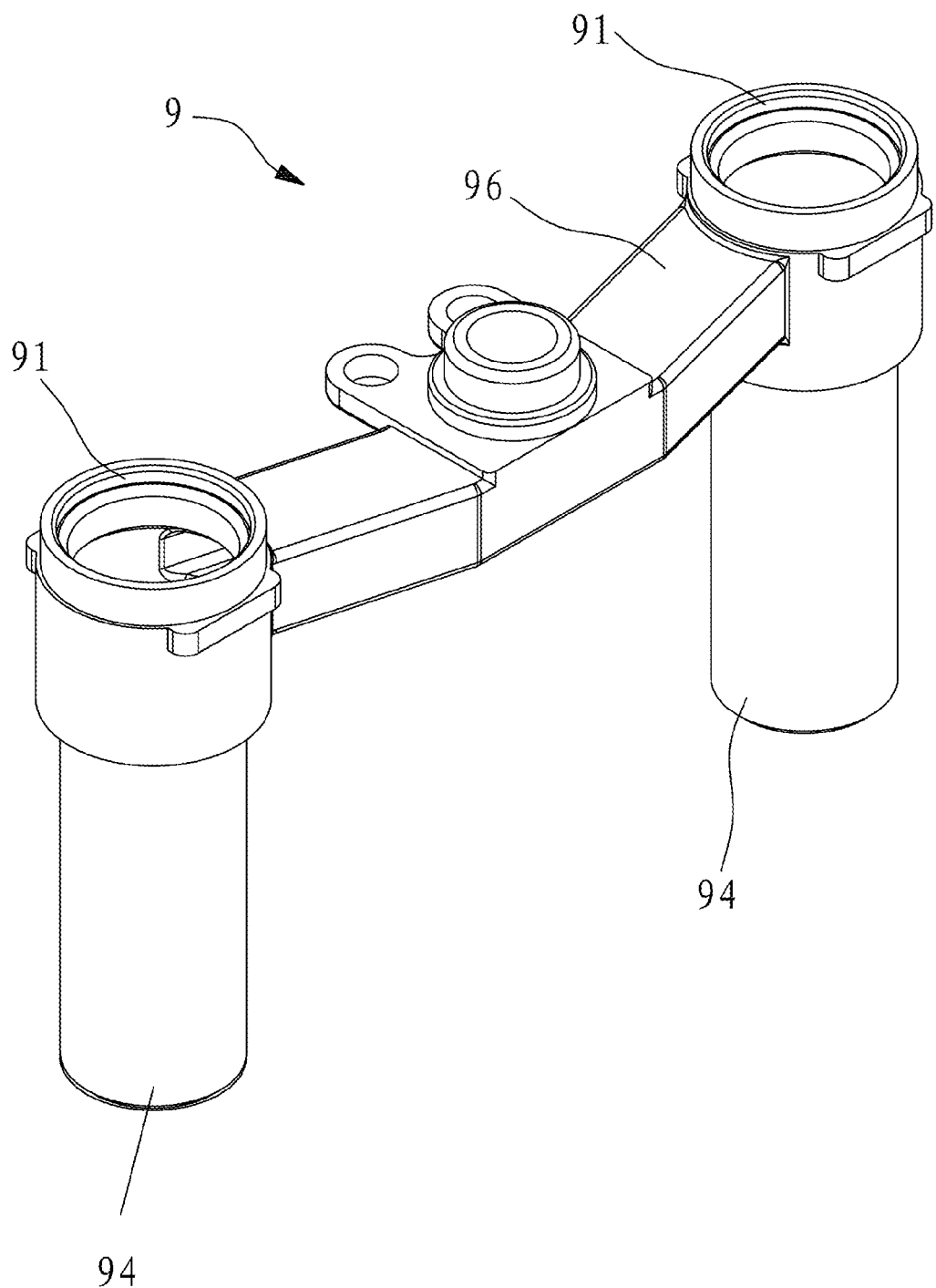
FIG. 2 is a structural view showing the valve seats, the connecting tube, and the inlet pins in the existing double-handle faucet.

REFERENCE NUMERALS IN THE DRAWINGS 100 double-handle faucet
1 valve seat
11 upper annular flange
111 upper surface
12 lower annular flange
2 spool
3 inlet pin
31 connecting ring
4 handle
5 outlet pipe
51 gasket
6 connecting tube
71 upper panel
72 lower panel
8 cladding member
81 first enveloping part
811 chamber
812 positioning step 82 second enveloping part
83 cap
831 cover body
832 circular engaging edge
833 through hole
834 lower surface
9 double-handle faucet
91 valve seat
92 spool
921 control lever
93 handle
94 inlet pin
95 outlet pipe
96 connecting tube
97 upper panel
98 lower panel
99 gasket

DETAILED DESCRIPTION OF THE INVENTION

The present invention will be described in detail hereinafter by referring to specific embodiments thereof, as so to further explain the technical solution of the present invention.

Figure 3:
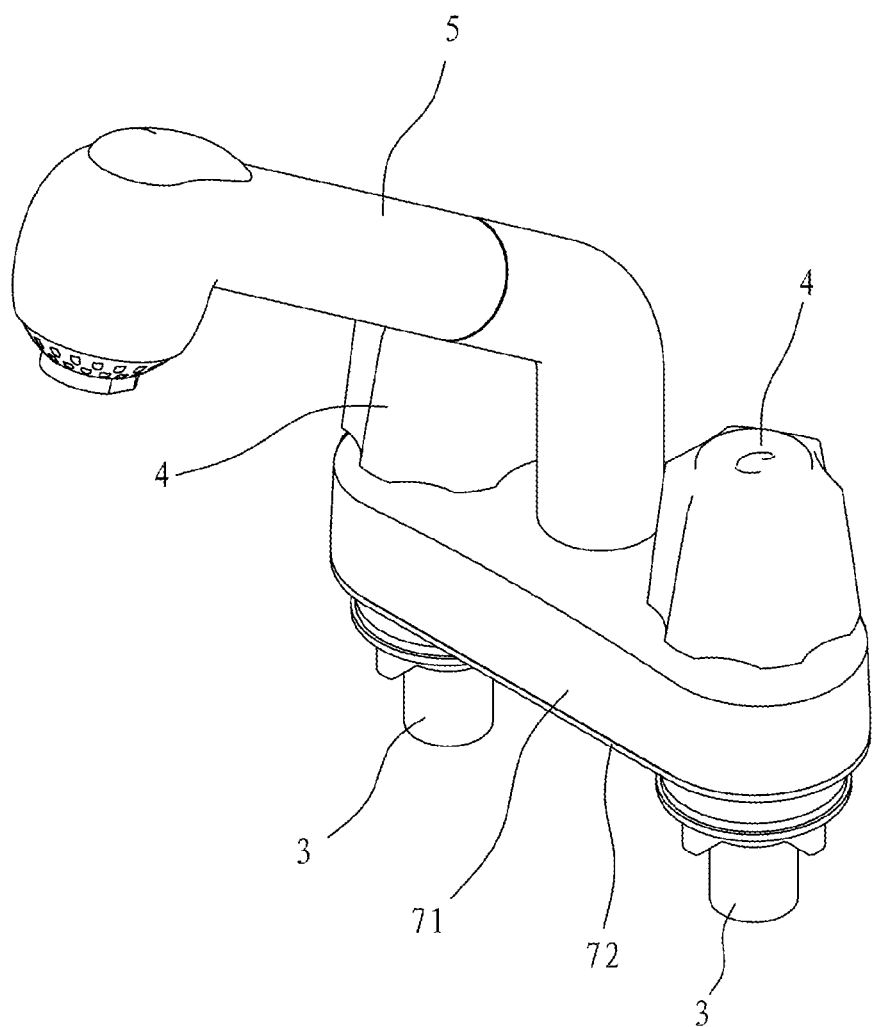
FIG. 3 is a structural view showing a double-handle faucet of the present invention.
Figure 4:
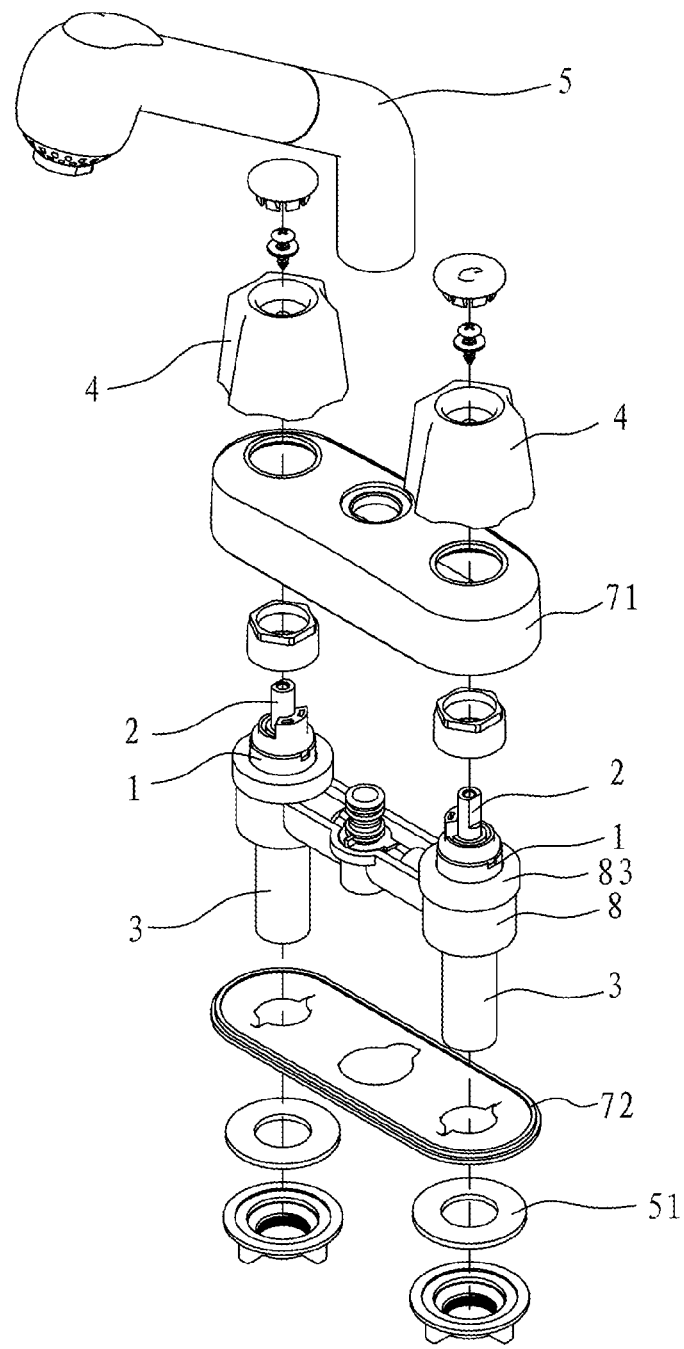
FIG. 4 is an exploded view showing a double-handle faucet the present invention.
Figure 5:
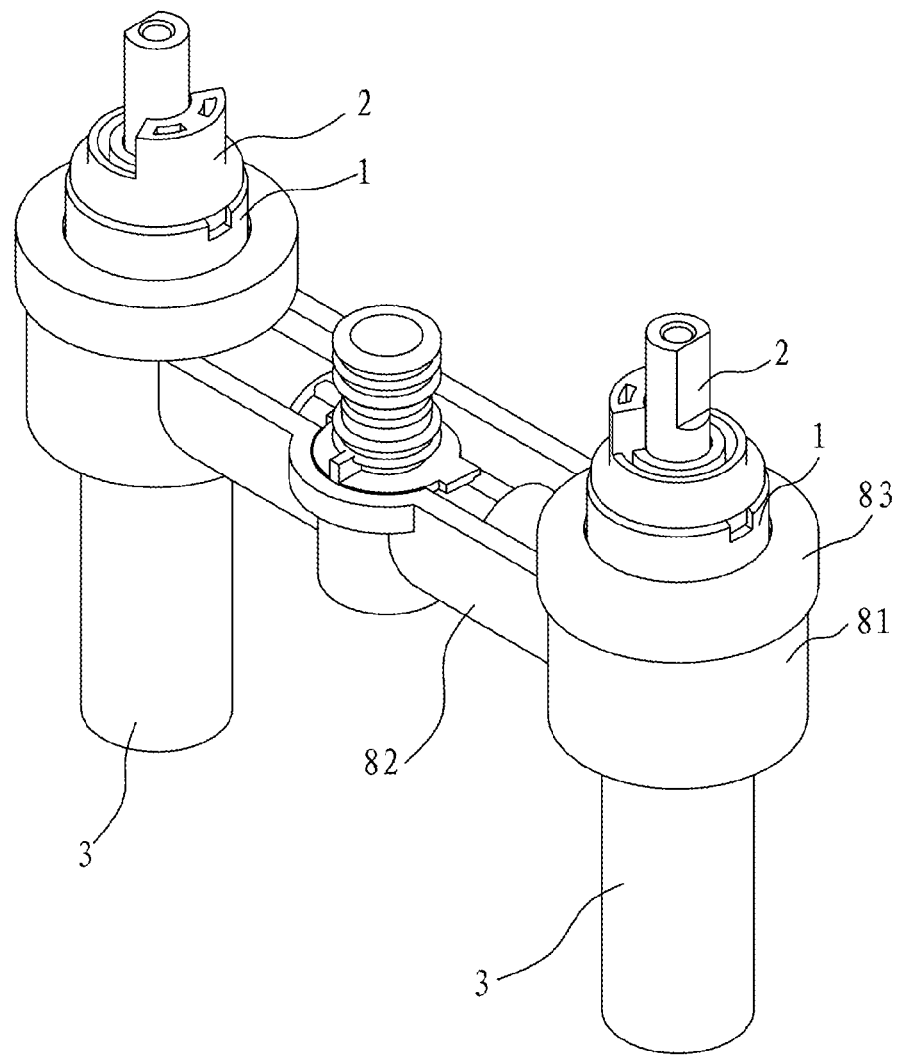
FIG. 5 is an assembling view showing the spools, the valve seats, the connecting tube, and the inlet pins in a preferred embodiment of the present invention.

Reference is made to FIGS. 3-7, which show structural views the novel double-handle faucet according to preferred embodiments of the present invention. As shown in FIGS. 3 and 4, like the prior art, the double-handle faucet 100 also comprises two valve seats 1, two spools 2, two inlet pins 3, two handles 4, an outlet pipe 5, a connecting tube 6, an upper panel 71, and a lower panel 72. The two valve seats 1 are connected by the connecting tube 6. A gasket 51 is further arranged between the inlet pins 3 and a cool water pipe or a hot water pipe. The above features and their connection relationship are basically identical to those in the prior art. They are not the emphasis of the present invention, and thus are not described in detail herein.

The core improvements of the present invention lie in that the double-handle faucet 100 further comprises a cladding member 8 and two caps 83, and the two valve seats 1, the connecting tube 6, the cladding member 8, and two caps 83 are all made of a plastic material.

As shown in FIGS. 4-7, each of the valve seats 1 is provided with an upper annular flange 11 and a lower annular flange 12. The upper annular flange 11 and the lower annular flange 12 are arranged in the vertical direction and spaced apart from each other. As shown in the drawing, the upper annular flange 11 is arranged over the lower annular flange 12.

Figure 6:
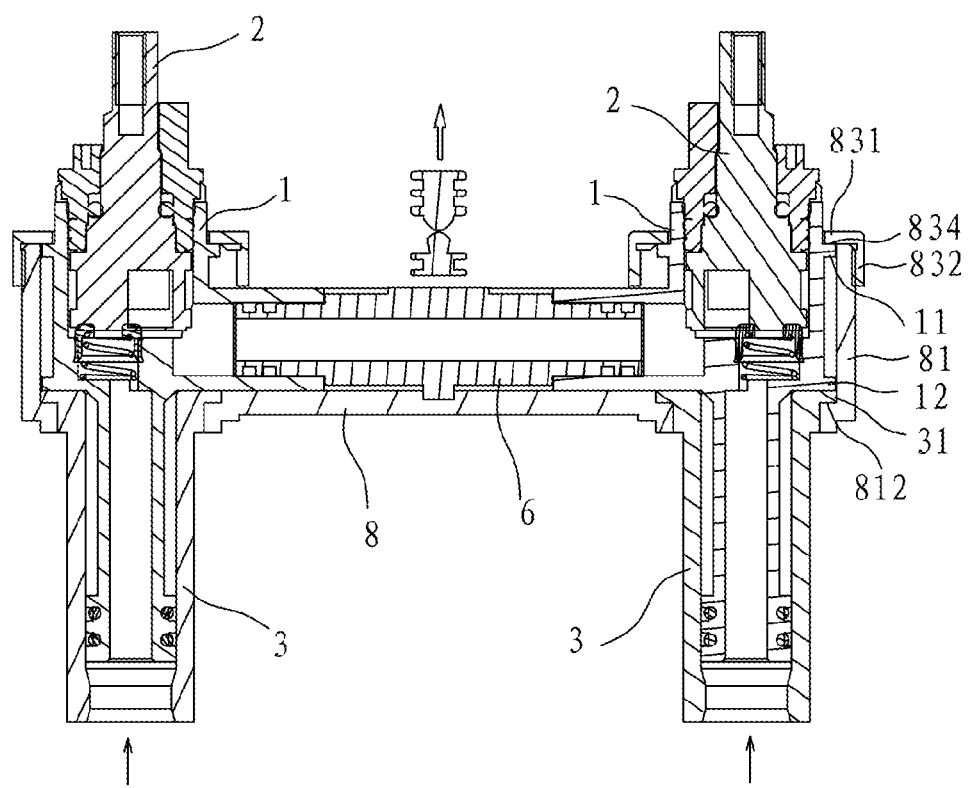
FIG. 6 is a cross sectional view of FIG. 5.
Figure 7:
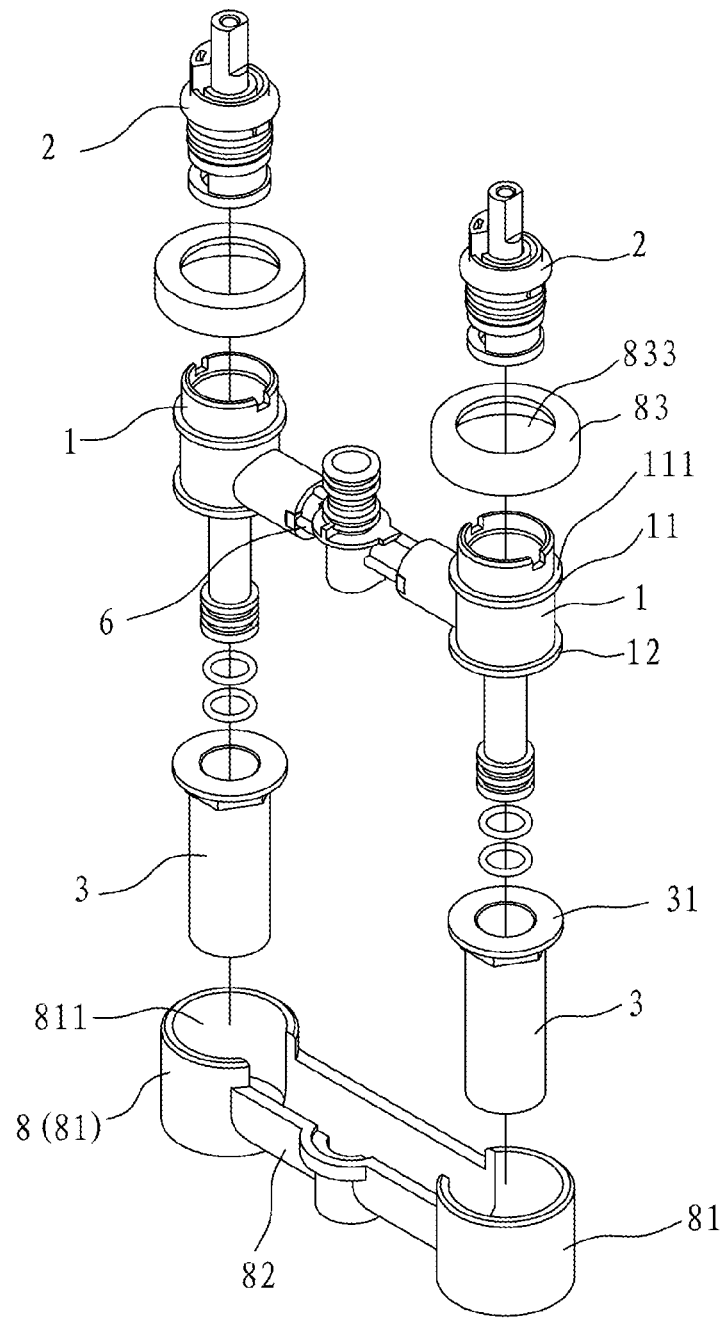
FIG. 7 is an exploded view showing the spools, the valve seats, the connecting tube, and the inlet pins in a preferred embodiment of the present invention.

As shown in FIGS. 6 and 7, each of the inlet pins 3 is further provided with a connecting ring 31. As shown in FIG. 7, the cladding member 8 comprises two first enveloping parts 81 and a second enveloping part 82. The second enveloping part 82 is between the two first enveloping parts 81, and the second enveloping part 82 forms an integral part with the two first enveloping parts 81. The two first enveloping parts 81 are located at both sides of the cladding member 8 and are both provided with a chamber 811 for accommodating the valve seats at respective side. The chamber 811 is provided with a positioning step 812 at the bottom. The connecting ring 31 is abutted against the positioning step 812. The second enveloping part 82 covers the outer side of the connecting tube 6. Each of the caps 83 is provided with a cover body 831 and a circular engaging edge 832 which is formed along the periphery of the cover body 831. The cover body 831 is provided with a through hole 833 through which the valve seats 1 and the spool 2 pass. When the circular engaging edge 832 and the first enveloping part 81 are fully engaged with each other, the upper surface 111 of the upper annular flange 11 collides with the lower surface 834 of the cover body 831.

In this manner, in the novel double-handle faucet 100 of the invention, the two valve seats 1, the connecting tube 6, the cladding member 8, and two caps 83 are all made of a plastic material, so that lead hazard can be completely removed. Besides, based on the provision of the cladding member 8 and the structural design regarding the valve seats 1, the inlet pins 3, and two caps 83, the valve seats and the inlet pins can be firmly fastened by the cladding member 8 and two caps 83, so as to fasten the inlet pins 3 and the valve seats 1. In this way, the whole structural strength of the double handle 100 can be greatly enhanced. Therefore, at the premises of meeting the relating industrial standards, it is possible to reduce strength of the plastics itself, thus further reduce the production cost significantly.

Of course, in the practical implementation, the inlet pins 3 can be made of metal, and the strength at the inlet end can be improved significantly by torsion test. Besides, the outlet pipe 5 can be installed on the connecting tube 6 in a detachable manner. For example, the outlet pipe 5 can be directly inserted into the connecting tube 6, and the outlet pipe 5 and the connecting tube 6 are fastened together by a screw or the like. Alternatively, the outlet pipe 5 and the connecting tube 6 can be connected directly by means of screw threads, thus improving the versatility of the double-handle faucet 100. For example, the outlet pipe 5 of different specifications can be replaced for a 4-inch basin, a 4 or 8-inch kitchen faucet. Thus, the faucet is easy to replace and has a low cost.

The embodiments and drawings set forth above do not intend to limit the mode and design of the product according to the present invention. Any variation and modification thereto by the ordinary skilled in the art should fall within the scope of the present invention.

What is claimed is:

1. A novel double-handle faucet comprising two valve seats, two spools, two inlet pins, two handles, an outlet pipe, a connecting tube, an upper panel, and a lower panel, the two valve seats are connected by the connecting tube; characterized in that, the novel double-handle faucet further comprises a cladding member, and two caps, the two valve seats, the connecting tube, the cladding member, and two caps are all made of a plastic material, each of the valve seats is provided with an upper annular flange and a lower annular flange which are arranged in the vertical direction and spaced apart from each other, each of the inlet pins is further provided with a connecting ring, the cladding member comprises two first enveloping parts and a second enveloping part which is between the two first enveloping parts and forms an integral part with the two first enveloping parts, the two first enveloping parts are located at a left side and a right side of the cladding member respectively and are each provided with a chamber for accommodating a respective valve seat of the two valve seats at respective side, the chamber is provided with a positioning step at the bottom, the connecting ring is abutted against the positioning step, the second enveloping part covers the outer side of the connecting tube, each of the caps is provided with a cover body and a circular engaging edge which is formed along the periphery of the cover body, the cover body is provided with a through hole through which the valve seats and the spool pass, when the circular engaging edge and the first enveloping part are fully engaged with each other, the upper surface of the upper annular flange collides with the lower surface of the cover body.

\* \* \* \* \*